(12) United States Patent
Bae et al.

(10) Patent No.: US 10,115,964 B2
(45) Date of Patent: Oct. 30, 2018

(54) ADVANCED SI-C COMPOSITE ANODE ELECTRODE FOR HIGH ENERGY DENSITY AND LONGER CYCLE LIFE

(71) Applicant: PALO ALTO RESEARCH CENTER INCORPORATED, Palo Alto, CA (US)

(72) Inventors: Chang-Jun Bae, Mountain View, CA (US); Eric J. Shrader, Belmont, CA (US); Jessy Rivest, Palo Alto, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 515 days.

(21) Appl. No.: 14/563,341

(22) Filed: Dec. 8, 2014

(65) Prior Publication Data

US 2016/0164079 A1    Jun. 9, 2016

(51) Int. Cl.
*H01M 4/36*    (2006.01)
*H01M 4/38*    (2006.01)
*H01M 4/58*    (2010.01)
*H01M 4/587*   (2010.01)
*H01M 4/04*    (2006.01)
*H01M 4/134*   (2010.01)
*H01M 4/1395*  (2010.01)
*H01M 4/48*    (2010.01)
*H01M 4/62*    (2006.01)
*H01M 10/0525* (2010.01)

(52) U.S. Cl.
CPC ......... *H01M 4/366* (2013.01); *H01M 4/0402* (2013.01); *H01M 4/0404* (2013.01); *H01M 4/0411* (2013.01); *H01M 4/134* (2013.01); *H01M 4/1395* (2013.01); *H01M 4/364* (2013.01); *H01M 4/386* (2013.01); *H01M 4/483* (2013.01); *H01M 4/587* (2013.01); *H01M 4/625* (2013.01); *H01M 4/0428* (2013.01); *H01M 10/0525* (2013.01)

(58) Field of Classification Search
None
See application file for complete search history.

(56) References Cited

U.S. PATENT DOCUMENTS

| | | |
|---|---|---|
| 7,765,949 B2 | 8/2010 | Fork et al. |
| 7,780,812 B2 | 8/2010 | Fork et al. |
| 7,922,471 B2 | 4/2011 | Fork et al. |

(Continued)

OTHER PUBLICATIONS

Saint et al., "Towards a Fundamental Understanding of the Improved Electrochemical Performance of Silicon-Carbon Composites," Advanced Functional Materials 2007, 17:1765-1774.

(Continued)

*Primary Examiner* — Jonathan Crepeau
(74) *Attorney, Agent, or Firm* — Miller Nash Graham & Dunn LLP (57) ABSTRACT

An electrode has a first set of stripes of a graphite-containing material, and a second set of stripes of silicon-containing material interdigitated with the first set of stripes. A method of manufacturing an electrode includes extruding first and second materials simultaneously onto a substrate in interdigitated stripes, wherein the first material comprises a graphite-containing material and the second material comprises a silicon-containing material.

7 Claims, 9 Drawing Sheets

(56) References Cited

U.S. PATENT DOCUMENTS

| | | | |
|---|---|---|---|
| 2003/0138698 A1* | 7/2003 | Lee | C04B 35/6268 |
| | | | 429/231.8 |
| 2012/0229096 A1* | 9/2012 | Nazri | B82Y 30/00 |
| | | | 320/137 |
| 2014/0050977 A1* | 2/2014 | Sanada | H01M 4/04 |
| | | | 429/211 |
| 2015/0076399 A1* | 3/2015 | Sugiyama | H01M 4/364 |
| | | | 252/182.1 |
| 2016/0226064 A1* | 8/2016 | Kitayoshi | H01M 4/0404 |
| 2016/0248081 A1* | 8/2016 | Bohnke | H01M 4/0404 |
| 2017/0244101 A1* | 8/2017 | Put | H01M 4/0416 |

OTHER PUBLICATIONS

Hu, Yong-Sheng, et al., Superior Storage Performance of a Si@SiOx/C Nanocomposite as Anode Material for Lithium-Ion Batteries, Angewandte Chemi Int. Ed. 2008, 47:1645-1649.

Liu, Gao, et al., "Polymers with Tailored Electronic Structure for High Capacity Lithium Battery Electrodes," Advanced Materials 2011, 23:4679-4683.

Jiang, Tao et al., "Preparation and characterization of silicon-based three-dimensional cellular anode for lithium ion battery," Electrochemistry Communications 2006, 9:930-934.

Piper, Daniela Molina et al., "Reversible High-Capacity Si Nanocomposite Anodes for Lithium-ion Batteries Enabled by Molecular Layer Deposition," Advanced Materials 2014, 26:1596-1601.

\* cited by examiner

ADVANCED SI-C COMPOSITE ANODE ELECTRODE FOR HIGH ENERGY DENSITY AND LONGER CYCLE LIFE

RELATED APPLICATIONS

This application is related to the following applications, all of which are incorporated by reference herein in their entity:

U.S. patent Ser. No. 13/727,960, "Advanced, High Power and Energy Battery Electrode Manufactured by Co-Extrusion Printing," filed Dec. 27, 2012;

U.S. patent Ser. No. 13/727,993, "Three-Dimensional Co-Extruded Battery Electrodes," filed Dec. 27, 2012;

U.S. patent Ser. No. 14/034,855, "Dispersant for Improved Battery Electrode Formulations," filed Sep. 24, 2013;

U.S. patent Ser. No. 14/448,590, "High Energy and Power Li-ion Battery Having Less Stress and Long-Term Cycling Capacity," filed Jul. 31, 2014;

U.S. patent Ser. No. 14/329,537, "High Performance All Solid Lithium Sulfur Battery with Fast Lithium Ion Conduction," filed Jul. 11, 2014; and U.S. patent Ser. No. 14/511,910, "Trapping Dissolved Polysulfide for High Performance Batteries," filed Oct. 10, 2014.

BACKGROUND

A strong demand exists for lithium ion (Li-ion) batteries with high energy density, longer cycle life, and better safety in portable electronic devices and power supply application such a long-range drivable electric vehicles (EVs) and hybrid EVs. Even though tremendous advances have occurred in Li-ion batteries, most still use commercial graphite as the main anode material for the last twenty years. Due to low electrochemical capacity of graphite (372 mAh/g), substantial efforts have focused on developing new negative electrode materials with improved storage capacity, especially silicon (Si) as a strong candidate because it has the highest theoretical capacity ($Li_{4.4}Si \approx 4200$ mAh/g) of all know materials, and being abundant and inexpensive. Generally, it shows a higher voltage plateau than that of graphite and lithiated silicon is more stable in typical electrolytes than lithiated graphite, making lithiated silicon safer.

However, commercialization of silicon has many difficulties because poor cycling performance resulting from large volume changes (~300%) upon the intercalation of Li-ion during charge step compared to that (~10%) of graphic. Current research efforts have mostly focused on the improvement of silicon anode cycling performance using several approaches such as silicon-carbon (Si—C) composite with reducing the Si particle size, adding the Si particles in a carbon matrix, creating a carbon coating layer on Si particles, applying different binders with higher bonding strength, or restricting severe volume changes of Si using a three-dimension copper framework.

DETAILED DESCRIPTION OF THE EMBODIMENTS

Figure 1:
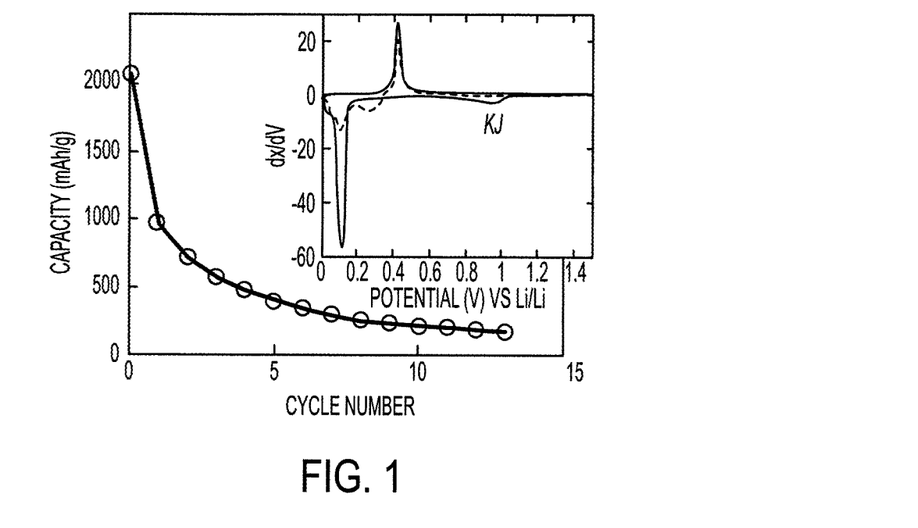
FIG. 1 shows a graph of changes in the charge/discharge capacity of silicon-based anode electrodes as a function of the number of cycles for micrometer-sized silicon particles.
Figure 2:
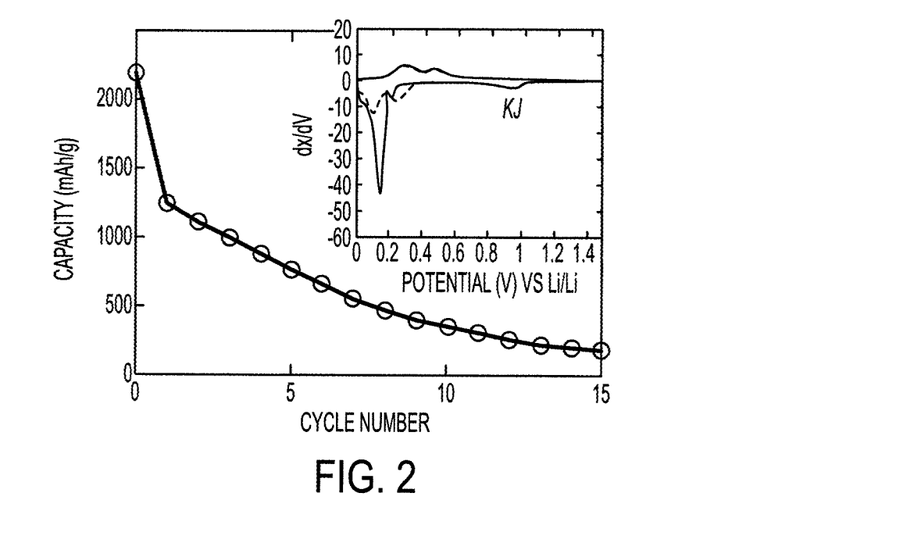
FIG. 2 shows a graph of changes in the charge/discharge capacity of silicon-based anode electrodes as a function of the number of cycles for nanometer-sized silicon particles.

In order to improve the specific capacity of negative silicon-based electrodes, approaches reducing the silicon particles to nanometer size, adding the silicon particles into carbon matrix composite, and creating carbon coating layer on silicon particles, have been explored. FIGS. 1 and 2 show the cycling behaviors of the micrometer and nanometer-sized Si anode electrodes. Even though the discharge capacity of nanometer-sized silicon at the first discharge is higher than that of micrometer-sized silicon, both cells have experienced severe capacity fade after 15 cycles and cell capacities drop to almost zero. Nanometer silicon particles were expected to reduce or avoid the mechanical stress developed by large volume expansion of Li—Si alloys, but the reduction of silicon particle size is not the critical parameter required for long battery cycle life.

Figure 3:
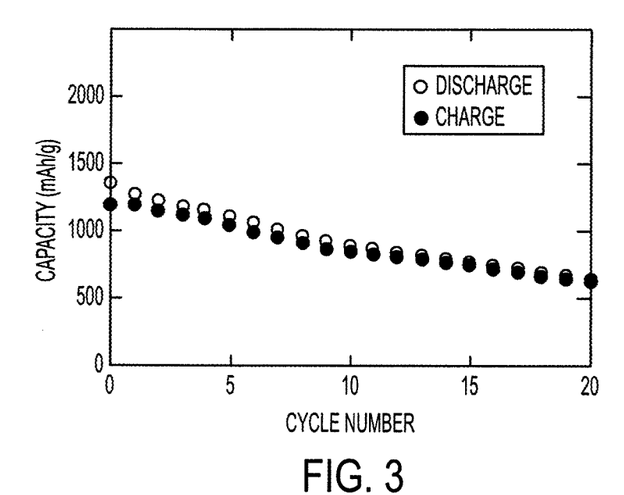
FIG. 3 shows a graph of changes in the charge/discharge capacity of silicon-based anode electrodes as a function of the number of cycles for micrometer-sized silicon particles in a carbon matrix.
Figure 4:
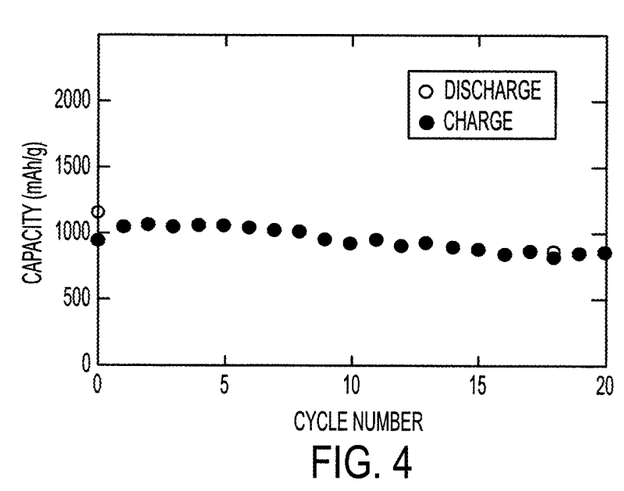
FIG. 4 shows a graph of changes in the charge/discharge capacity of silicon-based anode electrodes as a function of the number of cycles for nanometer-sized silicon particles in a carbon matrix.
Figure 5:
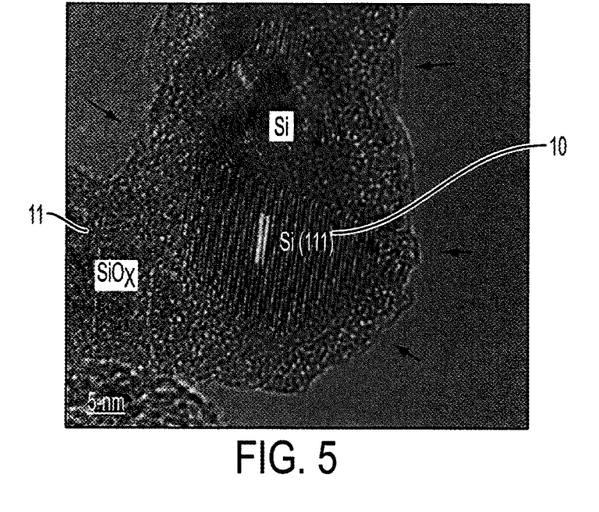
FIG. 5 shows a representation of a carbon-coated silicon particle in a carbon composite.
Figure 6:
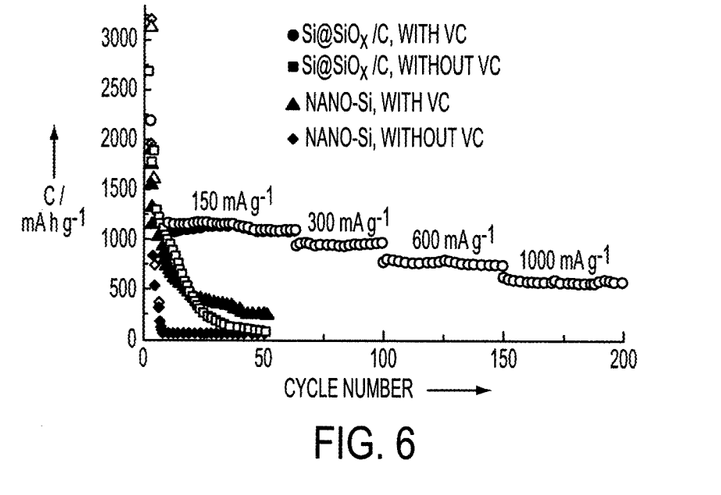
FIG. 6 shows a graph of changes in the charge/discharge capacity of silicon-based anode electrodes as a function of the number of cycles for carbon-coated particles in a carbon composite.
Figure 7:
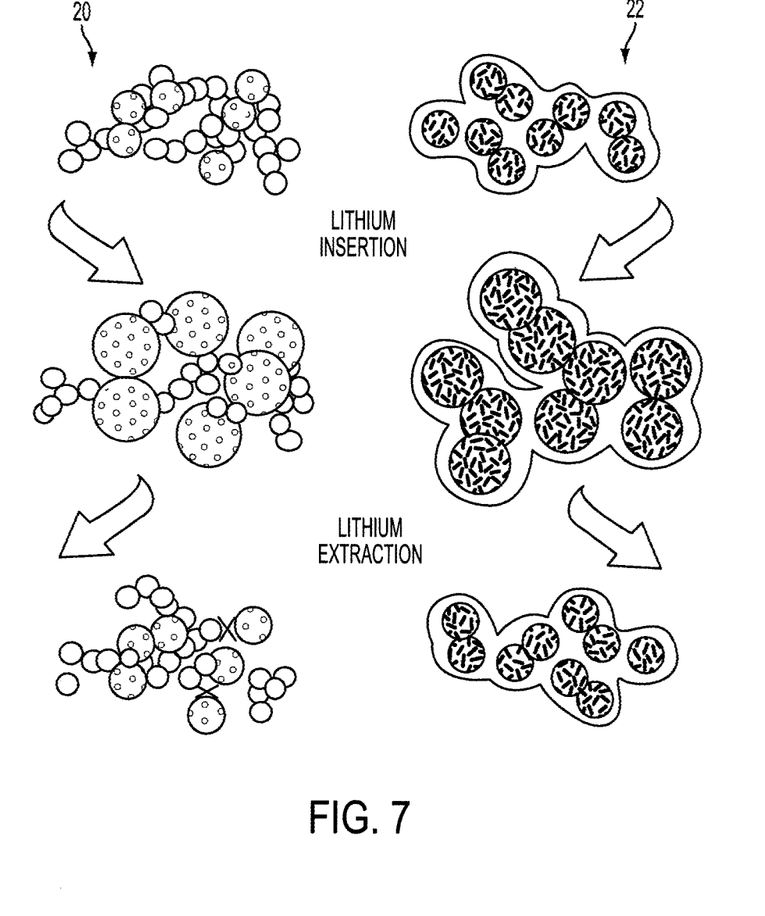
FIG. 7 shows a schematic diagram representing broken electric connections for a conventional binder system and interconnected electronic connections for new binder system.

FIGS. 3 and 4 represent the cycling performances of the Si—C composite anodes containing micrometer or nanometer-sized silicon particles, respectively. Compared to silicon anode electrodes in FIGS. 1 and 2, Si—C composites demonstrate much lower irreversible capacity at the first cycle, higher electrochemical lithiation of silicon, and better capacity retention with cycling. FIG. 5 shows the image of a silicon nanoparticle 10 coated with a layer of silicon oxide 12 and a layer of carbon represented by the black arrows. FIG. 6 shows a graph of the performance versus cycle number of a silicon-based anode electrode, respectively. FIG. 7 shows a schematic diagram of a traditional binder system 22 that lacks the mechanical integrity of the silicon-based anode electrode and lost electronic connectivity during many cycling steps. Because of the larger breakage elongation of the SBR (styrene butadiene rubber) elastomeric binder, the process used SBR (styrene butadiene rubber) and CMC (sodium carboxymethyl cellulose) to increase the elasticity of the binder material to the cycling stability of the Si-based anode electrode, and replaced standard PVDF (polyvinylidene fluoride).

Figure 8:
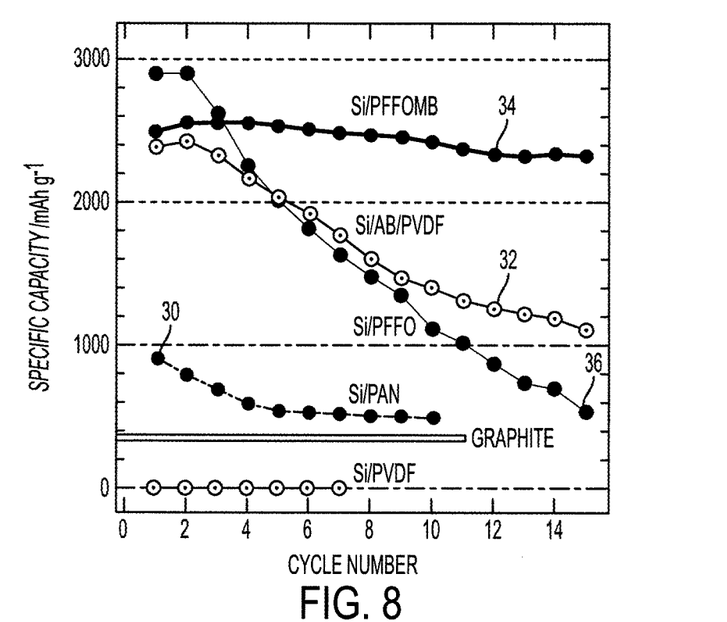
FIG. 8 shows a graph of specific capacity versus a number of cycles for different binder systems.
Figure 9:
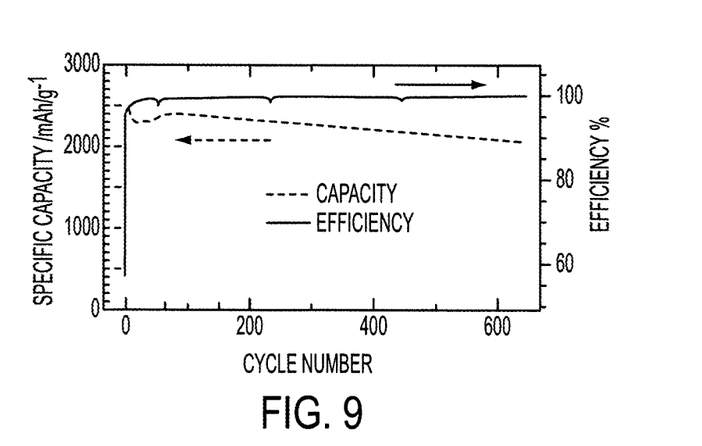
FIG. 9 shows a graph of specific capacity versus a number of cycles for a Si/PFFOMB composite.

Using an SBR and CMC binder mixture induces low irreversible capacity loss in the first cycle and low capacity losses upon the cycling, but generally does not retain a good electrochemical cycling performance similar to silicon-based anode electrodes. In order to maintain the electrical and mechanical integrity, a new conductive polymer binder 22 on the right side of FIG. 7 was developed by modifying the energy levels of the polymer conduction state, that is, the lowest unoccupied molecular orbital (LUMO). In the LUMO the electrons could cathodically dope the polymer to achieve proper electronic conductivity. Starting with the polyfluorene type polymers (PFFO), two functional groups of carbonyl and methylbenzoic (MB) ester were introduced, creating PFFOMB. The electrodes based on PAN (polyacrylonitrile) or PVDF (poly vinylidene fluoride), shown in FIG. 8 as curves 30 and 32, respectively, demonstrated poor performance due to the insulating nature of the polymer matrix. On the other hand, using a new binder system of PFFOMB shown as 34 in FIG. 8, creates high specific capacity and stable cycling performance with 2100 mAh/g for Si after 650 cycles as show in FIG. 9.

Figure 10:
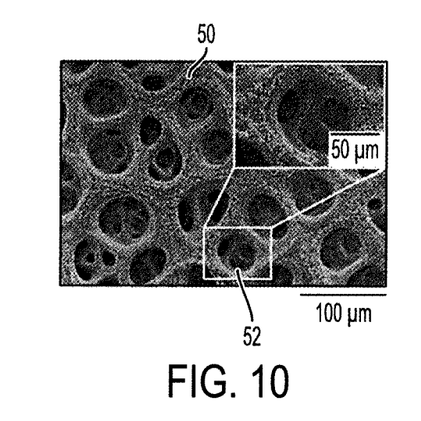
FIG. 10 shows a representation of an image of a three-dimensional copper cellular architecture.
Figure 11:
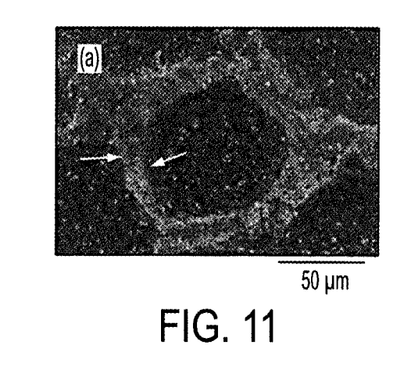
FIG. 11 shows a top view of the copper cellular architecture with infiltrated silicon powders.
Figure 12:
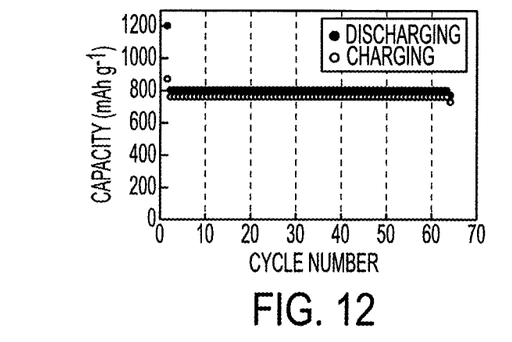
FIGS. 12 and 13 show cycle performance of silicon anode electrodes with and without three-dimensional copper based cellular framework.
Figure 13:
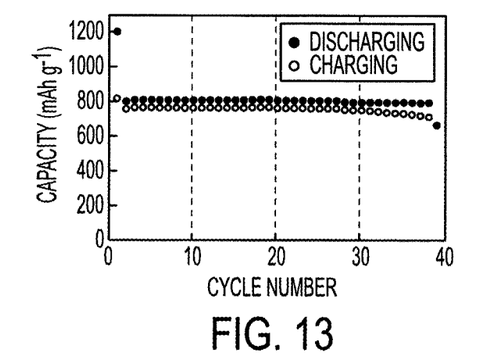

As another approach to restrict severe volume changes of silicon anode electrodes used a copper scaffold with 3D cellular architecture. FIGS. 10 and 11 show the images of a Si anode electrode before and after casting silicon powders into a 3D copper framework. In FIG. 10, the copper scaffold 50 has openings such as 52. In FIG. 11, a silicon particular 54 has filled the opening 52. FIGS. 12 and 13 show the result of a cycling test for silicon anode electrodes prepared with or without 3D cellular framework, respectively.

Both anode electrodes characterized in FIGS. 12 and 13 were prepared by casting slurries of 72 wt % Si, 20 wt % carbon black and 8 wt % poly (vinylidene fluoride) (PVDF) dissolved in N-methylpyrrolidinone (NMP). In spite of the large amount of carbon black as an electric conductive additive, coulombic efficiency of the anode electrode without the 3D cellular framework, shown in FIG. 13, starts to fall rapidly only after 26 cycles, which is associated with loose electrode structure due to enormous volume changes. However, the 3D scaffold-based Si anode electrodes demonstrated much better coulombic efficiency (above 90%) and improved performance with a completion of 63 charge-discharge cycles. The 3D matrix offers such a good conductive environment that the active materials can be stuck to the current collector without addition of conductive agents. With the ductility of a metal framework, it can also relieve the stress due to the volume changes, preventing mechanical failure of electrodes.

Given the reduction of Si particle size, adding the Si particles in a carbon matrix, creating carbon coating layer on Si particles, and capturing volume change of Si using the 3D copper framework as explained above, relieving the stress due to the volume change of Si particle during alloying and de-alloying becomes critical to improve cyclability and columbic efficiency of Si based anode electrodes. While microstructure modification of anode electrodes such as applying a 3D copper framework works well to relieve internal stress, it reduces the cell's energy density since the total mass of the inactive copper framework needs to be added so that it is not a commercially viable option. Here, the embodiments propose commercially viable Si based anode electrodes to effectively dissipate internal stress, maintain high electronic conductivity and longer cycling performance, and delivery much higher volumetric energy density.

Figure 14:
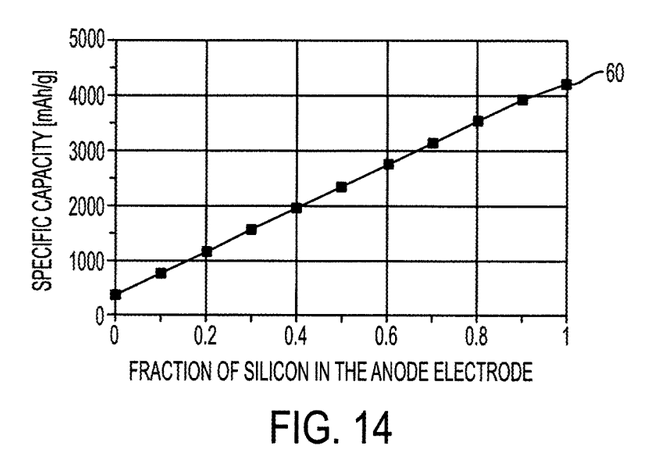
FIG. 14 shows a graph of specific capacity versus the fraction of silicon in the anode electrode.

FIG. 14 shows the resulting enhancements of specific capacities due to the addition of silicon into a graphite anode as curve 60. Specific capacity increased to 1161 mAh/g or 1950 mAh/g with the addition of silicon of 20 or 40 weight percent, respectively. One should note that the weight percent of silicon may be up to 50 weight percent. Therefore, if one can control large volume change of silicon, it will be easy to produce high density anode electrode without developing new materials.

Figure 15:
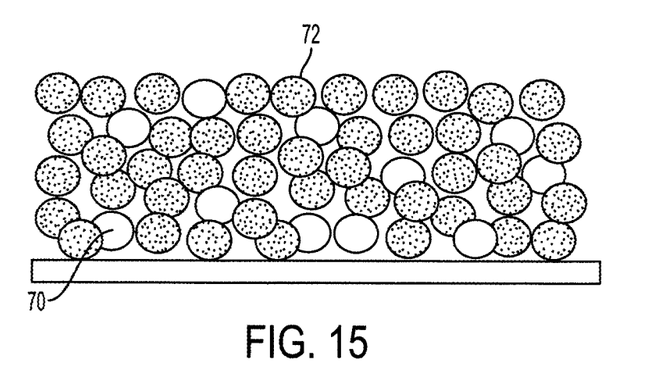
FIG. 15 shows an embodiment of a conventional silicon-graphite anode.

However, in a conventional, simple mixing process, control of the location of silicon 70 in the graphite matrix comprised of graphite particles such as 72 becomes difficult as shown in FIG. 15. Even though the specific capacity of the anode electrode increases as addition of silicon material, the cycle performance will suffer by non-homogenously dispersed silicon particles, especially when the silicon particles are mostly located near the current collector. Silicon will experience large volume changes and detach from the current collector so that high contact resistance will degrade cycling performance of silicon-based anodes.

Figure 16:
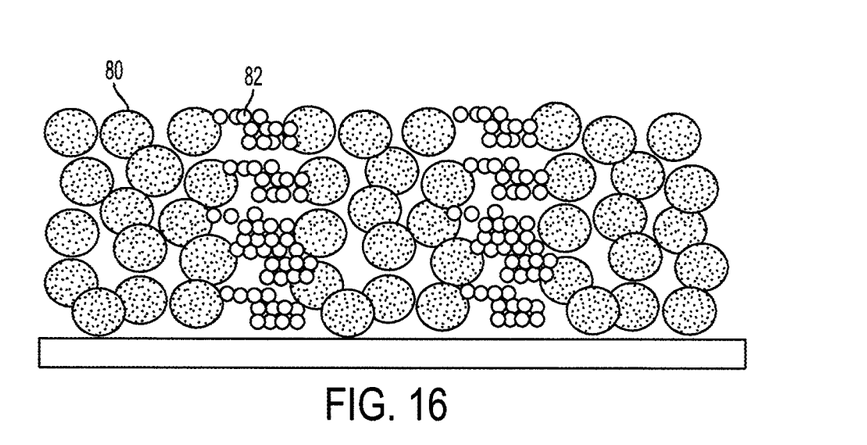
FIG. 16 shows an embodiment of a silicon graphite anode comprising alternating, interdigitated stripes of materials.

Embodiments here reduce large volume changes of the silicon and increase the specific capacity and volumetric energy density of Li-ion battery when silicon material is added into a graphite anode. FIG. 16 shows a new anode electrode with duplex structures consisting of alternating, or interdigitated, stripes of two materials, one graphite 80 and the other silicon or the mixture of silicon and graphite 82. Compared to the simple mixed structure in the conventional anode electrode, the duplex structure provides a unique benefit of easily adjusting the portion of the duplex structure according to the overall volume change of silicon material.

As explained earlier, graphite has experienced much less volume change (~10%) compared to the silicon (~300%) during charging and discharging steps. Therefore, graphite matrixes in the duplex structures not only alleviate the volume change of silicon, but also provides electric interconnection in the electrode. This allows improved cycling stability of Si—C composite.

Figure 17:
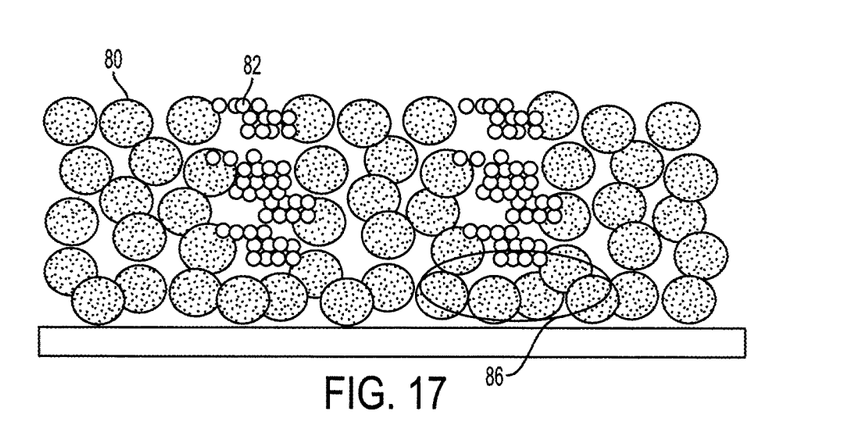
FIG. 17 shows another embodiment of a silicon graphite anode.

FIG. 17 shows an alternative embodiment of the duplex structure. In this structure, as shown in by region 86, the graphite is first deposited to cover the entire current collector, prior to the addition of the silicon. The use of a co-extrusion print head allows this structure to be manufactured in one printing pass through the control of the materials in the extrusion process. This results in the structure shown in FIG. 17.

Figure 18:
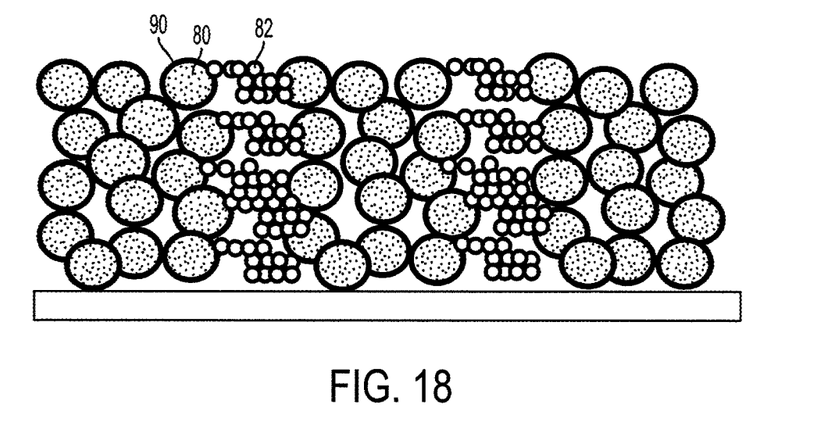
FIG. 18 shows an embodiment of a silicon graphite anode comprising alternating, interdigitated stripes of materials having an oxide coating.

In another embodiment, surface modification of Si—C composite with duplex structures on the back-end of the process may include a process of molecular layer deposition (MLD) as shown in FIG. 18 The MLD process develops an oxide coating layer 90 on the silicon and graphite particles, which help reduce the effect of parasitic side reactions between the liquid electrolyte and electrode surface used in most batteries. It also provides a mechanically robust, flexible coating layer to preserve structure integrity of Si—C composite.

While conventional processing methods are only able to create the simple structure shown in FIG. 15, co-extrusion printing systems reliably produce duplex structures with alternating stripes of two materials, one graphite and the other silicon or the mixture of silicon and graphite. The co-extrusion system feeds multiple viscous, particle-filled pastes into a print head that allows flows of separate fluids to alternately converge into interdigitated stripes of different materials. In the embodiments here, one paste would include graphite particles and another silicon particles or silicon and graphite particles. Similar micro co-extrusion/dispensing systems and methods are discussed in U.S. Pat. No. 7,765,949; U.S. Pat. No. 7,780,812; and U.S. Pat. No. 7,922,471; incorporated by reference here in their entirety, among others.

In this manner, a negative electrode (anode) results from this process that has high specific capacity over a higher number of cycles, reduced volume change and overall better performance than previous anodes.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. An electrode, comprising:
   a layer of alternating stripes of two different materials, wherein a first material is a graphite-containing material and a second material is a silicon-containing material, wherein the silicon-containing material resides in a three-dimensional graphite matrix.

2. The electrode of claim 1, further comprising an oxide coating on particles of the graphite-containing material and an oxide coating on particles of the silicon-containing material.

3. The electrode of claim 1, wherein the graphite-containing material comprises particles of graphite in a paste.

4. The electrode of claim 1, wherein the silicon-containing material comprises particles of silicon in a paste.

5. The electrode of claim 1, wherein the silicon-containing material has a weight percent of up to 50 weight percent.

6. The electrode of claim 1, further comprising a current collector, wherein the graphite-containing material forms a coating covering the entire current collector upon which the layer of alternating stripes of two materials reside.

7. An electrode, comprising:
   a first set of stripes of a graphite-containing material; and
   a second set of stripes of silicon-containing material interdigitated with the first set of stripes, the silicon material residing in a three-dimensional graphite matrix, wherein the graphite-containing material forms a coating covering the entire current collector upon which the first and second set of stripes reside.

* * * * *